United States Patent [19]

Levine

[11] 4,093,927

[45] June 6, 1978

[54] PULSED GAS LASER

[75] Inventor: Jeffrey Steven Levine, Lexington, Mass.

[73] Assignee: Massachusetts Institute of Technology, Cambridge, Mass.

[21] Appl. No.: 650,912

[22] Filed: Jan. 21, 1976

[51] Int. Cl.² ............................................. H01S 3/096
[52] U.S. Cl. ............................................. 331/94.5 PE
[58] Field of Search .......................... 331/94.5; 330/4.3

[56] References Cited

U.S. PATENT DOCUMENTS 3,821,664  6/1974  Godard et al. ................. 331/94.5 G

OTHER PUBLICATIONS

Steinvall et al., J. of Physics—Part E—Scientific Instruments, vol. 6, No. 11, Nov. 1973, pp. 1125–1128.

*Primary Examiner*—William L. Sikes
*Assistant Examiner*—Marcus S. Rasco
*Attorney, Agent, or Firm*—Arthur A. Smith, Jr.; John N. Williams

[57] ABSTRACT

A pulsed gas laser in which a multitude of sheet-form conductors are assembled face to face with aligned apertures defining a beam path through the thickness of the assembly. In the embodiment shown the conductors are paired to form transmission lines, one conductor of each transmission line being interrupted and exposed at the aperture to form a discharge gap while the opposite conductor is electrically isolated from the aperture. The impedance introduced to the transmission line discharge circuit by a suitable aperture is found to be sufficiently low to permit application of a fast rise voltage wave for energizing gas at the gap. Increase in the number of elements in the assembly can progressively increase performance over a wide range.

14 Claims, 11 Drawing Figures

PULSED GAS LASER

The invention herein described was made in the course of work performed under a contract with the Electronic Systems Division, Air Force Systems Command, U.S. Air Force.

BACKGROUND OF THE INVENTION

This invention relates to pulsed gas lasers and particularly to the type employing sheet-form transmission lines as the source of excitation, in a Blumlein pulse circuit. In such lasers a pair of parallel, coextending sheet-form conductors separated by a thickness of dielectric defines a capacitor which stores electrical energy. A discharge gap in one of the conductors is filled with active lasing gas. By rapid initiation of discharge of the capacitor, as by a spark gap device, the voltage wave propagating through the sheet-form conductor produces an electrical discharge at the gap resulting in lasing action in the gas. For further background the disclosure of U.S. Pat. No. 3,757,248 is incorporated by reference.

SUMMARY OF THE INVENTION

Objects of the invention are to provide a simple, easily manufactured laser construction which enables a selected volume of the lasing gas to be subjected to excitation, to provide a laser construction which can be scaled readily to a desired performance level, and to provide a laser construction having high output efficiency relative to size.

According to the invention a pulsed laser is formed by cooperative group of sheet-form conductors separated by dielectric, and defining discharge gaps, the conductors being assembled face-to-face, and each having at its discharge gap a radiation transmitting aperture normal to the plane of the conductor, these apertures being aligned to define an optical path through the thickness of the assembly. Means are provided for charging the conductors and means are provided for causing coordinated discharge to cause excitation of gas at the gaps to form a lasing pulse moving along the optical path.

According to a preferred embodiment of the invention the conductors are paired as transmission lines, a first conductor of each transmission line having an interruption defining a discharge gap and the second conductor being electrically isolated to prevent discharge through the aperture to the first conductor or to the next adjacent transmission line, preferably the second sheet-form conductor forming continuous conductive paths past both sides of the aperture.

In preferred embodiments the sheet-form conductors are disposed on dielectric insulating boards with holes through the thicknesses of the boards at the apertures and seals between successive boards about the apertures to confine the gas. Preferably the optical path is free of obstruction to communication of the lasing gas between the discharge gaps and conduits are arranged to provide axial flow of the gas along the optical path.

In another preferred embodiment gas passages are provided perpendicular to the optical path, between adjacent transmission lines, preferably the conductors being provided on self-supporting dielectric insulating board, and the gas passages extending between adjacent boards.

Also in preferred embodiments a shunt connection is provided between corresponding conductors of adjacent transmission lines in the assembly; opposite sides of the first conductors of the transmission lines are arranged for charging to the same voltage through a charging impedance; and the discharge means includes delay means between a first and a second transmission line of the assembly to compensate for the time of travel of a radiation pulse along the optical path from the first to the second transmission line, preferably employing an optically initiated spark gap associated with the second line, arranged to be initiated by radiation having a predetermined timed relation to the radiation pulse.

DESCRIPTION OF THE DRAWINGS

FIG. 8 is a top plan view of a preferred laser according to the invention employing the transmission line assembly of FIGS. 3–7 while

DESCRIPTION OF THE PREFERRED EMBODIMENTS

Figures 1, 2:
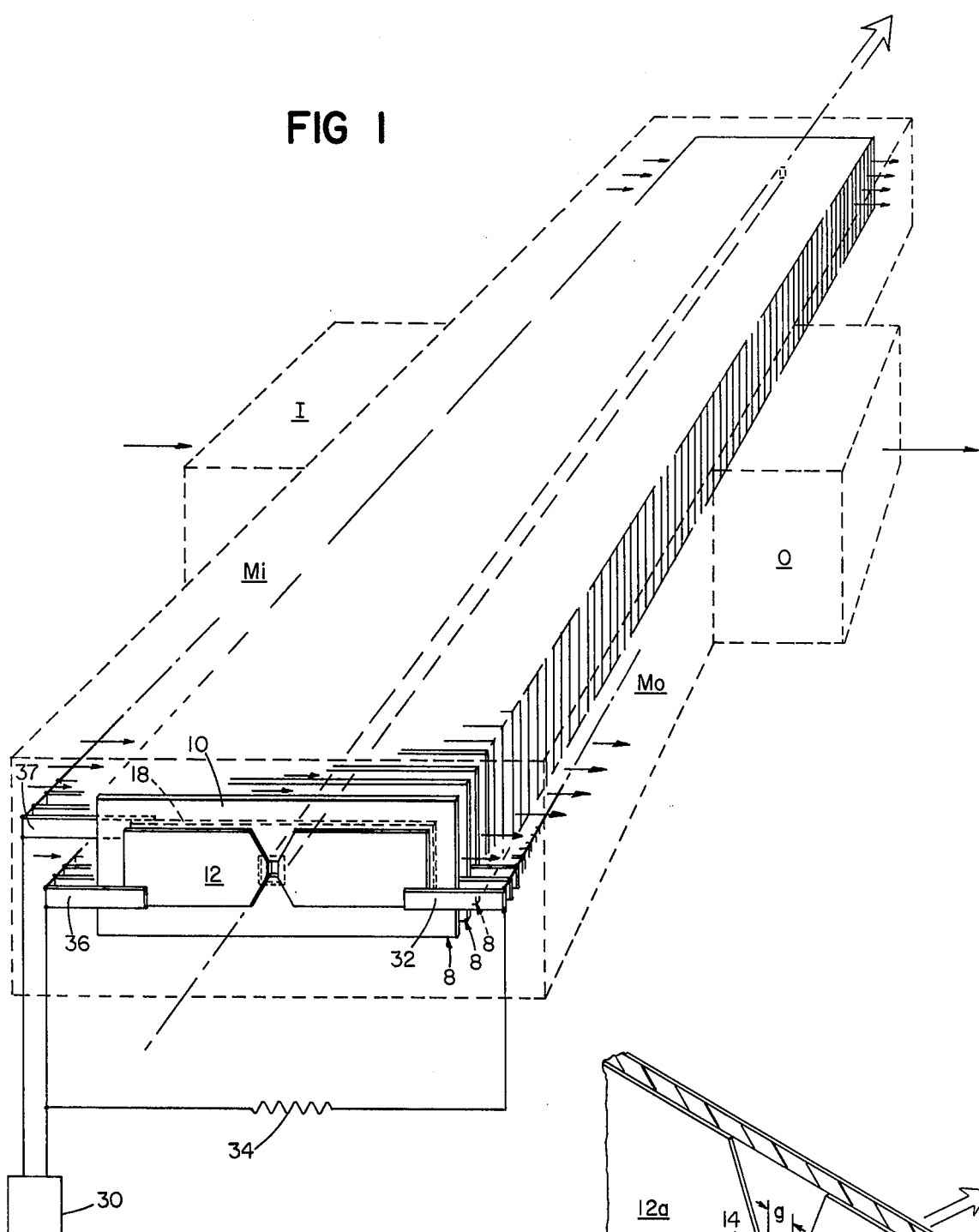
FIG. 1 is a partially diagrammatic perspective view of a laser according to a preferred embodiment of the invention.
FIG. 2 is a diagrammatic perspective.
Figure 3:
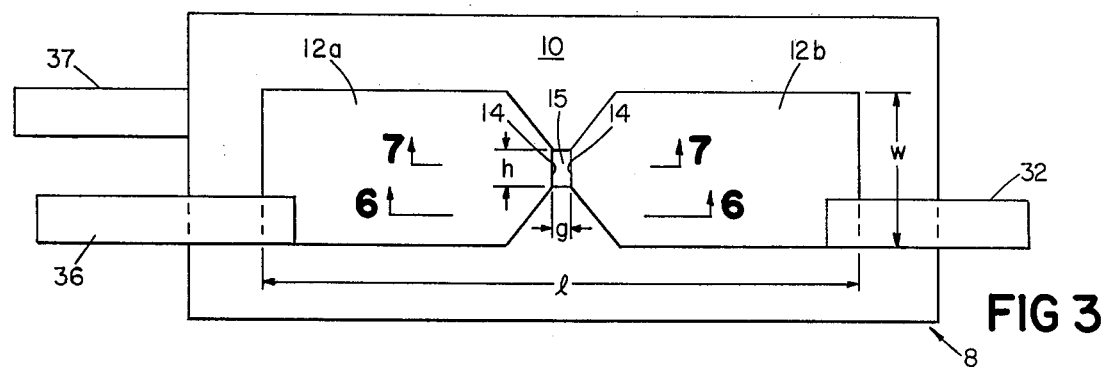
FIG. 3 is a top plan and FIG. 4 a bottom plan view of a transmission line element useful in the embodiments of FIGS. 1 and 8.
Figure 4:
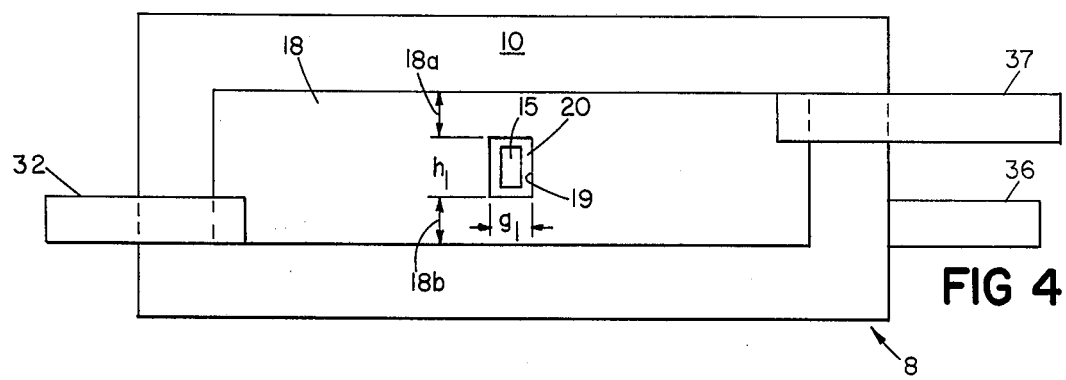
Figure 5:
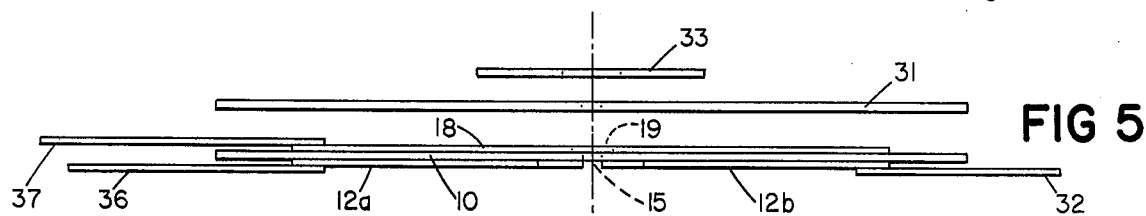
FIG. 5 is an exploded view of components of the laser of FIG. 8 shown in reverse order to FIG. 7 to illustrate the method of assembly.
Figure 6:
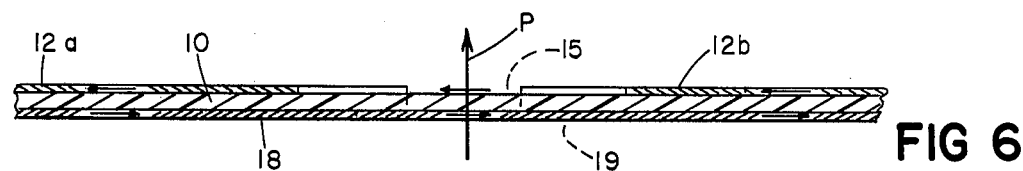
FIGS. 6 and 7 are cross-sectional views of the assembled components taken on lines 6—6 and 7—7 of FIG. 3, adapted for the FIG. 8 embodiment.
Figure 7:
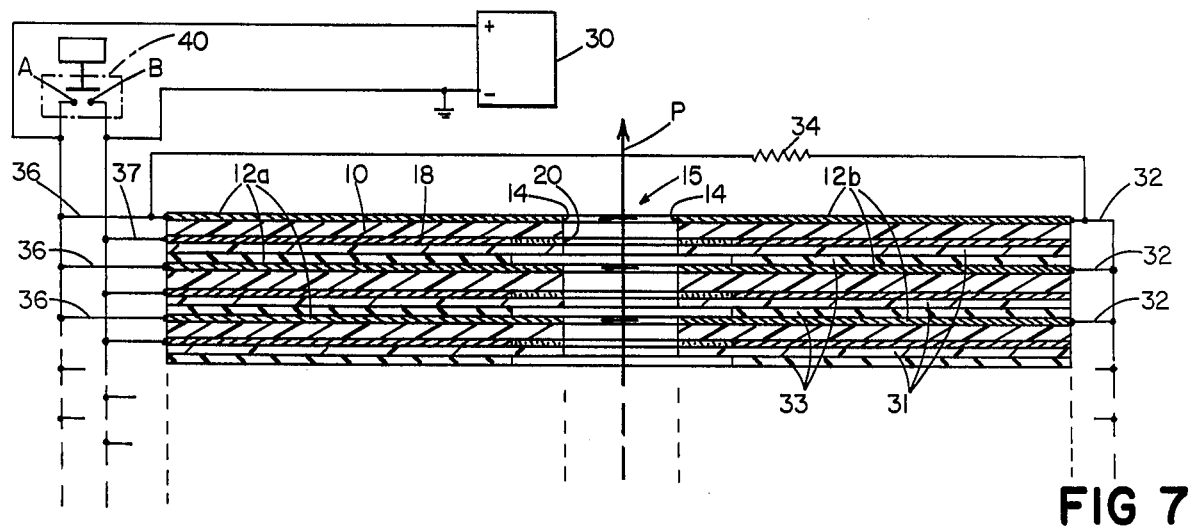
Figure 8:
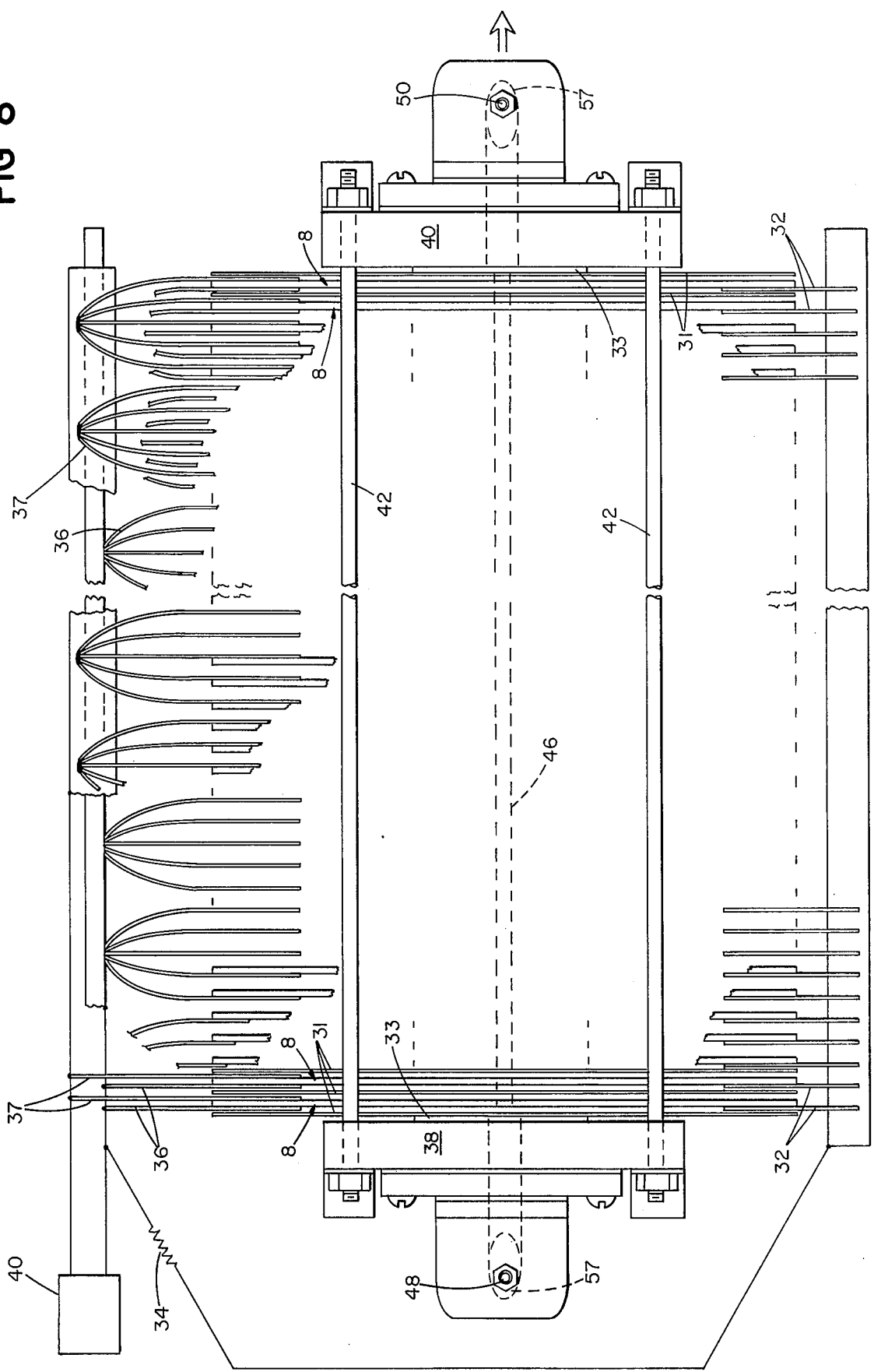

Referring to FIGS. 1 and 8 and the detailed views of FIGS. 2–7, transmission lines 8 are assembled in face-to-face relationship. Each transmission line comprises a planar epoxy circuit board 10 bearing on opposite sides conducting layers 12a, b and 18. A rectangular hole or aperture 15 is formed through the thickness of the insulating board, and co-planar conductive layer sections, 12a and 12b, are deposits which are electrically isolated from each other and have opposed edges 14 lying at opposite sides of the aperture 15, forming a discharge gap, filled with lasing gas. Referring to FIGS. 4, 6 and 7, the conductive layer 18 on the opposite side of the insulating board 10 is pierced by the aperture 15, but is continuous in regions 18a and 18b at opposite sides of the aperture. The conductive layer 18 terminates in the region of the aperture at boundaries 19 spaced from the aperture for electrical isolation purposes described below. Referring to FIGS. 1 and 7, the series of transmission lines is assembled with apertures 15 aligned to form optical path P.

For energization, a high voltage source 30 (FIG. 7) is connected by shunt 36 to sections 12a of the first conductor of each of the transmission lines, and sections 12a and 12b of the outer transmission line element are connected through charging impedance 34. This impedance is sufficiently high compared to the conduction path in the ionized gas in the gap during discharge so that negligible current flows through the charging impedance 34 during the short time of discharge. The second conductors 18 are shunted together by connection 37, and are connected to the ground of high voltage source 30. For discharge of the transmission line a spark gap switch 40 is provided having electrodes A and B connected respectively to the shunt connections 36 and 37 of the conductive members 12a and 18 respectively.

In operation, upon energization of the spark gap switch, a fast rise time voltage wave is created which propagates through conductor 12a of each transmission line element toward aperture 15. When it reaches the aperture, the voltage drop appears across the gap defined by opposed parallel edges 14 of conductors 12a and 12b. This creates a sheet of current flow across each gap, through the lasing gas, which persists while the charge on conductor 12b is dissipated.

The same action occurs simultaneously at each of the transmission lines triggered by the same spark gap switch, resulting in energization of a relatively large volume of gas compared to the active length along optical path P.

By incorporation of this unit in an optical cavity, a laser output can be produced.

In constructing the laser a number of parameters must be observed. Depending upon the particular lasing gas selected, and the usual operating characteristics, the number of transmission lines selected must be sufficient to ensure that the gain medium in the direction of the optical path is sufficiently great; i.e., that the gain per unit distance times the length of the gain medium exceeds the single pass loss of the resonator.

In the case of a pulsed nitrogen laser, for example, per FIG. 8, a group of forty-five transmission lines has been found sufficient where an operating voltage of 16 kilovolts is employed with the dimensions of the transmission lines corresponding to the following table:

$w = 5$ cm.

$l = 21$ cm.

$g = 1$ cm.

$h = 1.3$ cm.

Depending upon the life time of the upper state of the particular lasing gas selected, the size of the aperture 15 must be limited, thus to limit the area and hence the impedance of the loop formed by the current flowing across the gap between conductor 12a and 12b and the current flowing in the opposite direction in conductor 18 at paths 18a and 18b at the opposite sides of the aperture 15. The aperture size given above is suitable for nitrogen gas at 40 to 80 torr.

It is important to ensure that the discharge is uniform and coincident with the optical path. Thus it is advantageous that the conductors 12a and 12b taper from full width $w$ to height $h$ in the direction of the apertures 15, ensuring that the closest spacing of these conductors is at the aperture, between edges 14.

Further to ensure a uniform sheet-like glow discharge between edges 14, discharge at the aperture is prevented between the upper and lower conductors or plates 12 and 18. For this purpose the aperture in the conductor 18 is formed with dimensions $g_1 > g$ and $h_1 > h$, and insulating material 20 is interposed between the boundary edges of conductor 18 and the aperture 15.

Depending upon the repetition rate desired and the nature of the construction materials, provisions are desirable for renewal of the lasing gas. This is readily made possible with either transverse, see FIG. 1, or axial, see FIGS. 8-10, flow paths. In FIG. 1 are inlet duct I, inlet manifold $M_i$, outlet manifold $M_o$ and outlet duct O. As suggested by the arrows the gas flows between adjacent transmission line elements, continually renewing the gas at the apertures and ensuring that proper temperature conditions are maintained.

Figure 9:
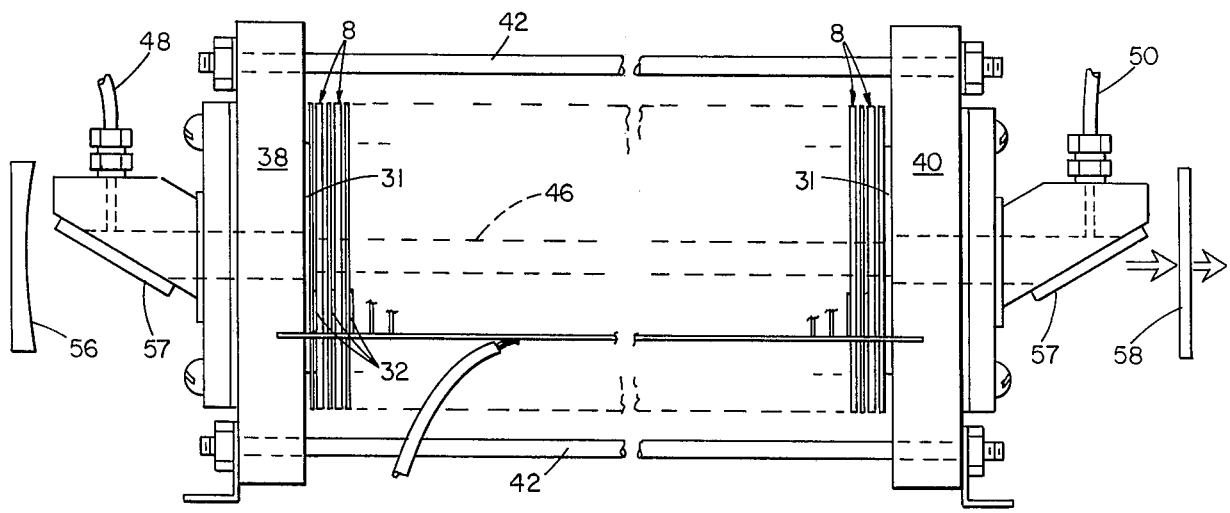
FIGS. 9 and 10 are side and end views of the construction of FIG. 8.
Figure 10:
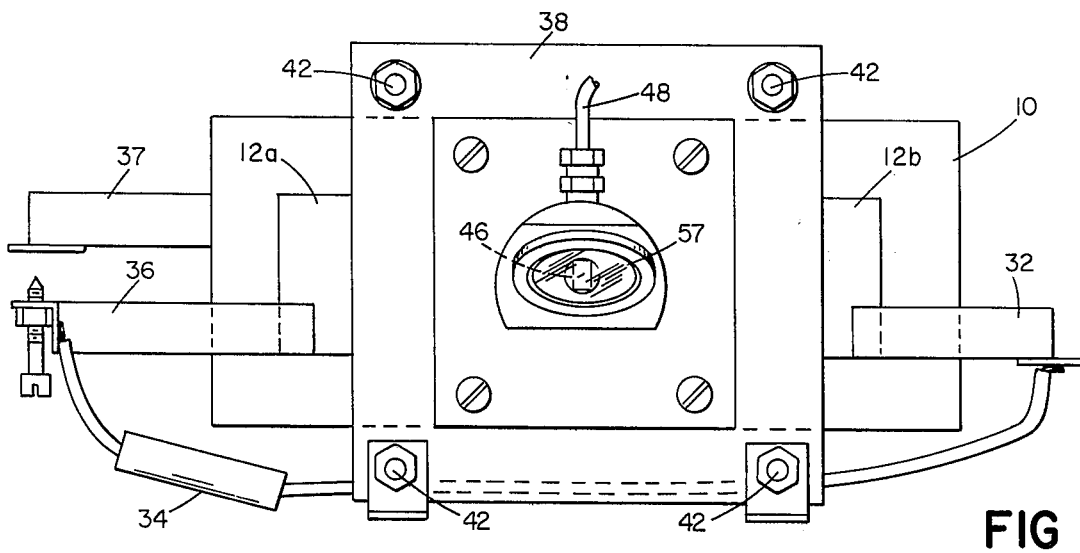

In FIGS. 8-10, transmission line elements 8, interleaved with suitable insulation members, are held under compression to define a vacuum chamber with axial flow path for the lasing gas through the apertures. This construction will now be explained in greater detail.

Referring to FIGS. 3-7, planar epoxy circuit boards 10 of 1/16 inch thickness carry first and second conductors 12 and 18 as layers of copper clad of .003 inch thickness, dimension t, FIG. 2.

In the margin provided by the oversize of the aperture in conductor 18 a layer of epoxy cement 20 is provided and a suitably apertured fiberglass insulation sheet 31 of 1/32 inch thickness is laid over conductor 18, adhered to the cement margin 20. An elastomeric gasket member 33 of 1/32 inch thickness with enlarged aperture is laid over the fiberglass insulation sheet, contacting on its opposite side the first conductor 12 of the next succeeding transmission line. Referring to FIGS. 8 and 9, the assembly of the selected number of transmission lines is placed between end plates 38, 40 which are drawn together by tie rods 42, thus placing the gaskets under compression, forming the vacuum chamber 46.

The end plates are provided with inlet and outlet conduits 48, 50 for producing an axial gas flow. The laser cavity employs Brewster angle windows 57, at opposite ends, a totally reflective mirror 56 at one end and a flat mirror 58 at the other end of 50% transmissivity (mirrors being unnecessary when more transition line elements are provided in the stack).

For making the electrical connections in accordance with FIG. 7, ½ inch wide copper strips of 0.003 inch thickness are secured to the various conductors and joined to a bus in groups as suggested in the figures.

In the embodiment just described, employing 45 transmission line elements, it is possible to trigger the discharge of all elements simultaneously by common conductors. The inherent separateness and small inductance of each capacitor ensures that all will discharge without preference, the charging impedance 34 acting as an open circuit relative to the fast rise time pulse. The duration of excitation of the upper state of, e.g., nitrogen, is sufficiently long to persist at the last gap when photons arrive there from the first gap.

In larger assemblies, e.g., when 500 or so transmission line elements are employed, timed switching of successive transmission lines or groups of lines is advantageously employed.

Figure 11:
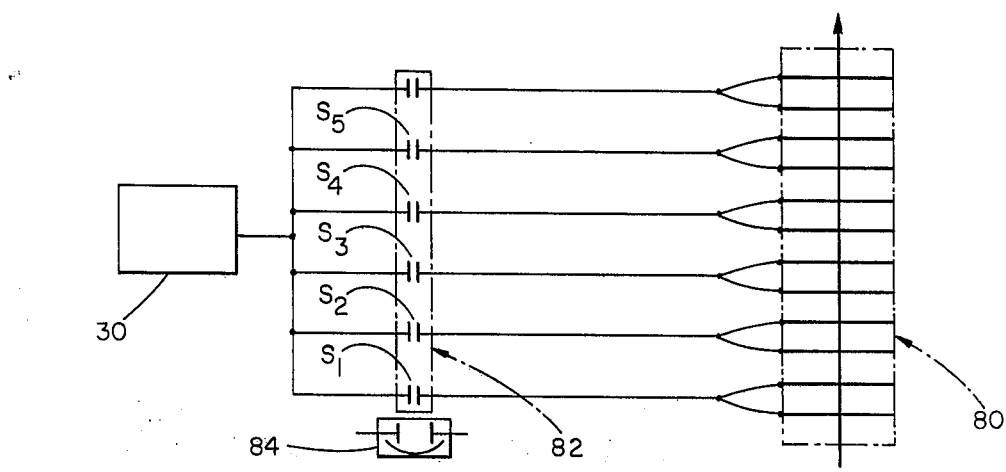
FIG. 11 is a diagrammatic view of a laser employing a preferred switching arrangement according to the invention.

Referring to FIG. 11, a stacked transmission line assembly 80 in accordance with the foregoing is provided with a multistage spark gap switch 82. The switch gas volume has a seed gas constituent which is readily photoionized, e.g., trimethyl amine, and the spark gaps $s_1$–$s_5$ are designed to be triggered when full charging voltage is applied and photons are received from trigger lamp 84. The spark gap chamber has a length corresponding to the length of the laser chamber 80 and groups of conductors to be switched are connected to spark gap electrodes at equivalent spacing along the spark gap chamber. Thus upon the flashing of trigger lamp 84, spark gap $s_1$ is first energized, switching the corresponding initial transmission line in the laser assembly. In timed relation, photons traveling from trigger lamp 84 activate switches $s_2$–$s_5$ and corresponding transmission lines in sequence, corresponding to the progress of photons along the laser chamber from previously activated transmission lines.

It will be seen that the laser can be constructed of rugged components where manufacture and assembly can be readily automated, and that the unit can be readily scaled to achieve performance characteristics as required.

The fact that the laser is capable of applying very fast rise time electrical pulse to a large gas volume makes the system very advantageous for use with gases which have a short lifetime upper state (and correspondingly advantageous large cross-section for electro-excitation from ground state).

However, a number of advantages can be obtained even in connection with gases which are capable of CW lasing action. In such cases the fast rise time enables uniform application of energy in quantities which, if applied over longer periods, would produce arcing due to time-dependent thermal action. Furthermore, due both to the relatively uniform discharge across the aperture of each laser plus the averaging effects for any inhomogeneities at the aperture, due to the large number of discharge gaps transited, relatively good optical mode quality is achievable for high energy beams, with attendant advantages in focusing and steering of the relatively planar wave front beam.

The short residence time of the gas provided by the gas flow paths illustrated avoids over-heating of the gas and enables removal of contaminants, thus permitting relatively high pulse repetition rates even when using components subject to vaporization.

Furthermore the high gain that is made possible according to the invention permits relaxation of specifications for alignment and other parameters of the laser construction.

While the laser construction described is useful for high energy applications, e.g., for direct isotope separation or photo-induced chemistry or for pumping dye lasers used therein, the compactness, scalability and simplicity of embodiments enabled by the invention can find use in many applications throughout the field of gas lasers.

What is claimed is:

1. In a pulsed gas laser of the transmission line type having first and second co-extending sheetform conductors separated throughout their mutual extent by dielectric, said sheet form conductors having broad oppositely directed faces and relatively thin edges, the first of said conductors having an interruption defining a discharge gap, a lasing gas in said gap, a charging means for applying opposite voltages to the respective conductors, and a discharge means for causing current flow between the conductors, thereby to produce a voltage drop and discharge across said gap for energizing said lasing gas, the improvement comprising a group of said sheet-form transmission lines assembled in face-to-face relationship, in which a said broad face of one of the conductors of any given transmission line in said group lies in a substantially parallel, coextending relationship to a corresponding face of the next adjacent transmission line, each said transmission line having at its discharge gap a radiation transmitting aperture having an optical axis normal to and extending through the planes of the conductors, the second conductors of said transmission lines being electrically continuous past said apertures while being isolated from said apertures to prevent discharge through said apertures between said first and second conductors, the optical axes of said apertures of said transmission lines being aligned to define an optical path normal to the faces of said transmission lines, passing through said lasing gas present at said discharge gaps, and means for causing coordinated discharge of said transmission lines to excite gas at said gaps to form a lasing pulse moving along said optical path.

2. The pulsed laser of claim 1 wherein a said second sheet-form conductor forms continuous conductive paths past opposite sides of said aperture.

3. The pulsed laser of claim 1 wherein said sheet-form conductors are disposed on dielectric insulating boards, with holes through the thickness of said boards at said apertures.

4. The pulsed laser of claim 3 wherein seals between successive boards about said apertures cooperate to confine the gas at said apertures.

5. The pulsed laser of claim 1 wherein said path is free of obstruction to communication of said lasing gas between said discharge gaps.

6. The pulsed laser of claim 5 wherein successive transmission lines are sealed together and conduits are arranged to provide axial flow of said lasing gas along said lasing path.

7. The pulsed laser of claim 1 wherein gas passages are provided perpendicular to said path, between adjacent transmission lines.

8. The pulsed laser of claim 7 wherein the dielectric of each transmission line is provided as a self-supporting dielectric insulating board, the first and second conductors of each line being disposed on opposite sides of the respective board, and said gas passages extend between adjacent boards.

9. The pulsed laser of claim 1 wherein a shunt connection is provided between corresponding conductors of adjacent transmission lines in said assembly.

10. The pulsed laser of claim 1 wherein opposite sides of the first conductors of said transmission lines are arranged for charging to the same voltage through a charging impedance.

11. The pulsed laser of claim 1 wherein said discharge means includes delay means between a first and a second transmission line of said assembly to compensate for the time of travel of a radiation pulse along said optical path from said first to said second transmission line.

12. The pulsed laser of claim 11 including an optically initiated spark gap associated with said second line, arranged to be initiated by radiation having a predetermined timed relation to said radiation pulse.

13. For use in a pulsed laser, a lasing assembly comprising a cooperative group of sheet-form conductors separated by dielectric, said conductors having broad faces and relatively thin edges and being assembled in face-to-face relationship, each conductor having a radiation transmitting aperture with optical axis normal to its plane, the optical axes of said apertures of said conductors aligned to define an optical path normal to the faces of said conductors, discharge gaps at said path filled with lasing gas, means for oppositely charging adjacent sheet-form conductors and means for causing coordinated discharge of said conductors through said gaps to cause excitation of gas at said gaps to form a lasing pulse moving along said optical path.

14. The pulsed laser assembly of claim 13 wherein said sheet-form conductors are disposed on dielectric insulating boards, with holes through the thickness of said boards at said apertures.

* * * * *